(12) United States Patent
Ohara et al.

(10) Patent No.: US 8,310,583 B2
(45) Date of Patent: Nov. 13, 2012

(54) LENS UNIT, IMAGE PICKUP APPARATUS, ELECTRONIC DEVICE AND AN IMAGE ABERRATION CONTROL METHOD

(75) Inventors: Naoto Ohara, Tokyo (JP); Yusuke Hayashi, Tokyo (JP); Tomoya Sugita, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 482 days.

(21) Appl. No.: 12/568,478

(22) Filed: Sep. 28, 2009

(65) Prior Publication Data

US 2010/0079658 A1 Apr. 1, 2010

(30) Foreign Application Priority Data

Sep. 29, 2008 (JP) ................................. 2008-251819

(51) Int. Cl.
*H04N 5/225* (2006.01)
(52) U.S. Cl. ....................................................... 348/340
(58) Field of Classification Search .................. None
See application file for complete search history.

(56) References Cited

U.S. PATENT DOCUMENTS

| 3,739,089 A | 6/1973 | Latall |
| 5,664,243 A | 9/1997 | Okada et al. |
| 5,748,371 A | 5/1998 | Cathey, Jr. et al. |
| 5,774,239 A * | 6/1998 | Feldman et al. ................ 359/9 |
| 6,021,005 A | 2/2000 | Cathey, Jr. et al. |
| 6,069,738 A | 5/2000 | Cathey, Jr. et al. |
| 6,073,851 A * | 6/2000 | Olmstead et al. ............. 359/565 |
| 6,148,528 A | 11/2000 | Jackson |
| 6,233,060 B1 | 5/2001 | Shu et al. |
| 6,241,656 B1 | 6/2001 | Suga |
| 6,351,332 B1 * | 2/2002 | Okuyama et al. ............. 359/558 |
| 6,449,087 B2 | 9/2002 | Ogino |
| 6,525,302 B2 | 2/2003 | Dowski, Jr. et al. |
| 6,606,669 B1 | 8/2003 | Nakagiri |
| 6,642,504 B2 | 11/2003 | Cathey, Jr. |
| 6,984,206 B2 | 1/2006 | Kumei et al. |
| 7,158,660 B2 | 1/2007 | Gee et al. |
| 7,400,393 B2 | 7/2008 | Shibata et al. |
| 7,583,301 B2 | 9/2009 | Sakurai et al. |
| 7,630,584 B2 | 12/2009 | Nose et al. |
| 7,719,772 B2 | 5/2010 | Mann et al. |
| 2002/0118457 A1 | 8/2002 | Dowski, Jr. |
| 2003/0063384 A1 * | 4/2003 | Dowski, Jr. ................... 359/558 |
| 2003/0076514 A1 | 4/2003 | Gallagher et al. |

(Continued)

FOREIGN PATENT DOCUMENTS

JP S63-229851 A 9/1988

(Continued)

OTHER PUBLICATIONS

Office Action dated Mar. 10, 2010 issued for U.S. Appl. No. 11/773,792.

(Continued)

*Primary Examiner* — Sinh Tran
*Assistant Examiner* — Jason Flohre
(74) *Attorney, Agent, or Firm* — Procopio, Cory, Hargreaves & Savitch LLP

(57) ABSTRACT

A lens unit using an aberration control module is disclosed. The lens unit can be operable to intentionally produce aberration. In the lens unit, a point-spread-function of a light beam passing through the lens unit becomes substantially circular.

30 Claims, 21 Drawing Sheets

U.S. PATENT DOCUMENTS

| | | | |
|---|---|---|---|
| 2003/0122926 A1 | 7/2003 | Kumei et al. | |
| 2003/0158503 A1 | 8/2003 | Matsumoto | |
| 2004/0136605 A1 | 7/2004 | Seger et al. | |
| 2004/0190762 A1* | 9/2004 | Dowski et al. | 382/128 |
| 2004/0257677 A1 | 12/2004 | Matsusaka | |
| 2005/0128342 A1 | 6/2005 | Izukawa | |
| 2006/0012385 A1 | 1/2006 | Tsao et al. | |
| 2006/0238879 A1* | 10/2006 | Togino | 359/637 |
| 2007/0086674 A1 | 4/2007 | Guan | |
| 2007/0268376 A1* | 11/2007 | Yoshikawa et al. | 348/222.1 |
| 2007/0291152 A1 | 12/2007 | Suekane et al. | |
| 2008/0007797 A1* | 1/2008 | Hayashi et al. | 358/474 |
| 2008/0012955 A1* | 1/2008 | Johnson et al. | 348/222.1 |
| 2008/0043126 A1 | 2/2008 | Hayashi | |
| 2008/0074507 A1* | 3/2008 | Ohara et al. | 348/222.1 |
| 2008/0081996 A1 | 4/2008 | Grenon et al. | |
| 2008/0259275 A1 | 10/2008 | Aoki et al. | |
| 2008/0278592 A1 | 11/2008 | Kuno et al. | |
| 2010/0012866 A1* | 1/2010 | Fan et al. | 250/568 |
| 2011/0115950 A1* | 5/2011 | Wach | 348/241 |

FOREIGN PATENT DOCUMENTS

| | | |
|---|---|---|
| JP | H03-010380 A | 1/1991 |
| JP | H03-175403 A | 7/1991 |
| JP | H06-130267 A | 5/1994 |
| JP | H08-128923 A | 5/1996 |
| JP | H10-145667 A | 5/1998 |
| JP | H11-261868 A | 9/1999 |
| JP | 2000-050146 A | 2/2000 |
| JP | 2000-098301 A | 7/2000 |
| JP | 2000-266979 A | 9/2000 |
| JP | 2000-275582 A | 10/2000 |
| JP | 2001-257930 A | 9/2001 |
| JP | 2001-346069 A | 12/2001 |
| JP | 2002-027047 A | 1/2002 |
| JP | 2002-127852 A | 5/2002 |
| JP | 2002-221657 A | 9/2002 |
| JP | 2003-185905 A | 7/2003 |
| JP | 2003-235794 A | 8/2003 |
| JP | 2003-244530 A | 8/2003 |
| JP | 2003-248171 A | 9/2003 |
| JP | 2003-262778 A | 9/2003 |
| JP | 2003-283878 A | 10/2003 |
| JP | 2004-037733 A | 2/2004 |
| JP | 2004-147188 A | 5/2004 |
| JP | 2004-153497 A | 5/2004 |
| JP | 2004-264577 A | 9/2004 |
| JP | 2004-328506 A | 11/2004 |
| JP | 2005-326684 A | 11/2005 |
| JP | 2006-139246 | 1/2006 |
| JP | 2006-049949 A | 2/2006 |
| JP | 2006-094112 A | 4/2006 |
| JP | 2006-154767 A | 6/2006 |
| JP | 2006-308987 A | 11/2006 |
| JP | 2007-060647 A | 3/2007 |
| JP | 2007-300208 A | 11/2007 |
| JP | 2008-017157 A | 1/2008 |
| JP | 2008-035282 A | 2/2008 |
| WO | 2006/022373 A | 3/2006 |
| WO | 2007/013621 A1 | 2/2007 |
| WO | 2007/074649 A1 | 7/2007 |

OTHER PUBLICATIONS

Final Office Action dated Aug. 18, 2010 issued for U.S. Appl. No. 11/773,792.

Office Action dated Jun. 10, 2010 issued for U.S. Appl. No. 11/861,217.

International Search Report dated May 12, 2009 issued by the Japanese Patent Office for International Application No. PCT/JP2009/056376.

Office Action dated Jan. 19, 2011 issued by the Japanese patent Office for Japanese Application No. JP 2006-259646.

Dowski, Edward R. Jr., et al., "Wavefront Coding: a modern method of archieving high-performance and/or low-cost imaging systems", Current Developments in Optical Designs and Optical Engineering VIII, Proc. SPIE vol. 3779, p. 137-145, Oct. 1999.

Dowski, Edward R. Jr., et al., "Wavefront Coding: jointly optimized optical and digital imaging systems", Ed. Proc. SPIE Visual Information Processing IX, vol. 4041, p. 114-120, Apr. 25, 2000.

Dowski, Edward R. Jr. et al., Extended depth of field through wavefront coding, Appl. Opt. vol. 34, pp. 1859-1866, (1995).

* cited by examiner

JAN

CODE49

QR CODE

Z-Axis

Z-Axis

Z-Axis

Z-Axis

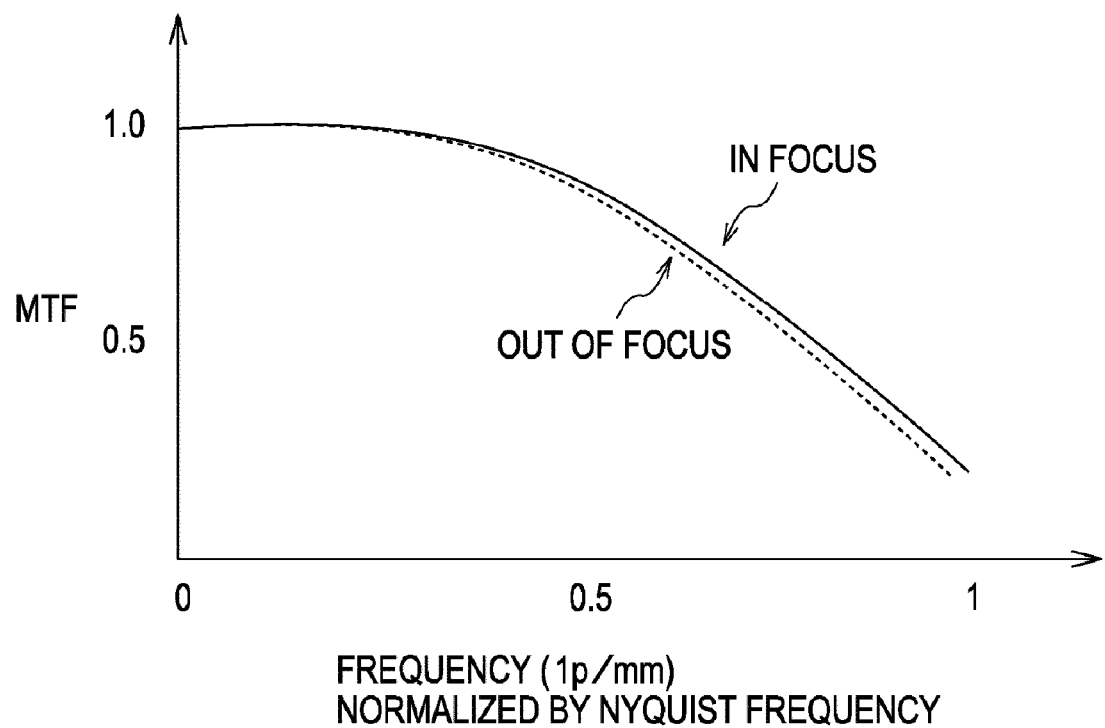

LENS UNIT, IMAGE PICKUP APPARATUS, ELECTRONIC DEVICE AND AN IMAGE ABERRATION CONTROL METHOD

CROSS-REFERENCE TO RELATED APPLICATION

The present application claims priority under 35 U.S.C. §119 to Japanese Patent Application No. 2008-251819, filed on Sep. 29, 2008, entitled "LENS UNIT, IMAGE PICKUP APPARATUS AND ELECTRONIC DEVICE". The content of which is incorporated by reference herein in its entirety.

FIELD OF THE INVENTION

Embodiments of the present invention relate generally to image pickup devices, and more particularly relate to lens units for optical systems.

BACKGROUND

With the rapid development of digitalization of information, digitalization in image processing is increasingly required. In digital cameras in particular, solid-state image pickup devices, such as Charge Coupled Devices (CCD) and Complementary Metal Oxide Semiconductor (CMOS) sensors, have been used instead of film.

In image pickup apparatuses including CCDs or CMOS sensors, an image of an object is optically taken by an optical system and is extracted by an image pickup device in a form of an electric signal. Such an image pickup apparatus may be used for reading close-up still images such as a barcode, an iris, or a character.

In lens systems used for optical imaging, depth of field is an important characteristic of the lens system. Depth of field is, without limitation, a portion of an imaged region (field) that appears sharp in an image. Since a lens system has a characteristic that a focus amount increases as an object distance decreases, depth of field extension is often useful. In barcode reading, for example, the depth of field can be extended by decreasing an aperture of the optical system. Unfortunately, when the aperture of the optical system is decreased, the amount of light decreases. As a result, a shutter speed required for imaging decreases, and a risk of motion blurring may increase.

Alternatively, automatic focusing can be used for depth of field extension. However, a driving section for automatic focusing is necessary, and this increases a cost and reduces durability and reliability of the image pickup apparatuses. Accordingly, a high-performance lens, such as a multifocal lens for extending the depth of field or a lens for extending the depth of field with a phase modulation element, is sometimes used. However, optical performance of the lens system may be reduced by an influence of reflection and diffraction by an edge in the high-performance lens having a discontinuous shape caused by variations in manufacturing of the lens system. Further, since a point-spread-function of the high-performance lens may be rotationally asymmetric, a size of a restoration filter of the high-performance lens increases, and a false image may be formed when restoration is insufficient.

Therefore, there is a need for an optical system for extending depth of field that uses a filter of a smaller size for image restoration while suppressing sensitivity to variations in manufacturing of the optical system.

SUMMARY

A lens unit comprising an aberration control module is disclosed. The lens unit can be operable to intentionally produce aberration. In the lens unit, a point-spread-function of a light beam passing through the aberration control optical system becomes substantially circular.

A first embodiment comprises a lens unit comprising a plurality of lenses and an aberration control module. The aberration control module is operable to produce an aberration in a light beam passing through the lens unit if a point-spread-function of the light beam becomes substantially circular.

A second embodiment comprises an image pickup apparatus. The image pickup apparatus comprises a lens unit. The lens unit comprises a plurality of lenses and an aberration control module. The aberration control module is operable to produce an aberration in a light beam passing through the lens unit if a point-spread-function of the light beam becomes substantially circular. The image pickup apparatus also comprises an image pickup device operable to capture an object image in the light beam.

A third embodiment comprises an electronic device comprising a lens unit and an image pickup device. The lens unit comprises a plurality of lenses and an aberration control module. The aberration control module is operable to produce an aberration in a light beam passing through the lens unit if a point-spread-function of the light beam becomes substantially circular. The image pickup apparatus also comprises a variable aperture stop operable to limit the light beam, and an image pickup device operable to capture an object image in the light beam.

A fourth embodiment comprises an image aberration control method in an image pickup apparatus comprising a lens unit. The image aberration control method comprises providing an aberration control surface to produce an aberration, operating a variable aperture stop to limit a light beam passing through the lens unit, and operating an image pickup device to capture an object image in the light beam. The object image is captured if a point-spread-function of the light beam becomes substantially circular.

BRIEF DESCRIPTION OF THE DRAWINGS

Embodiments of the present invention are hereinafter described in conjunction with the following figures, wherein like numerals denote like elements. The figures are provided for illustration and depict exemplary embodiments of the present invention. The figures are provided to facilitate understanding of the present invention without limiting the breadth, scope, scale, or applicability of the present invention. The drawings are not necessarily made to scale.

FIG. 22 is an illustration of an exemplary diagram illustrating the MTF response obtained after an image processing in the image pickup apparatus according to an embodiment of the invention.

DETAILED DESCRIPTION OF EXEMPLARY EMBODIMENTS

The following description is presented to enable a person of ordinary skill in the art to make and use the embodiments of the invention. The following detailed description is exemplary in nature and is not intended to limit the invention or the application and uses of the embodiments of the invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The invention should be accorded scope consistent with the claims, and not limited to the examples described and shown herein.

The following detailed description is exemplary in nature and is not intended to limit the invention or the application and uses according to one embodiments of the invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The invention should be accorded scope consistent with the claims, and not limited to the examples described and shown herein.

Embodiments of the invention are described herein in the context of practical non-limiting applications, namely image processing. Embodiments of the invention, however, are not limited to such image processing applications, and the techniques described herein may also be utilized in other optical applications such as, but without limitation, to image reader, image projection apparatuses, and the like. For example, the embodiments of the invention can be used, for example and without limitation, in a digital still camera, a mobile phone camera, a Personal Digital Assistant (PDA) camera, a camera used for a vehicle, an image inspection apparatus, an industrial camera used for automatic control, and the like.

As would be apparent to one of ordinary skill in the art after reading this description, these are merely examples and the embodiments of the present invention are not limited to operating in accordance with these examples. Other embodiments may be utilized and structural changes may be made without departing from the scope of the exemplary embodiments of the present invention.

Figure 1:
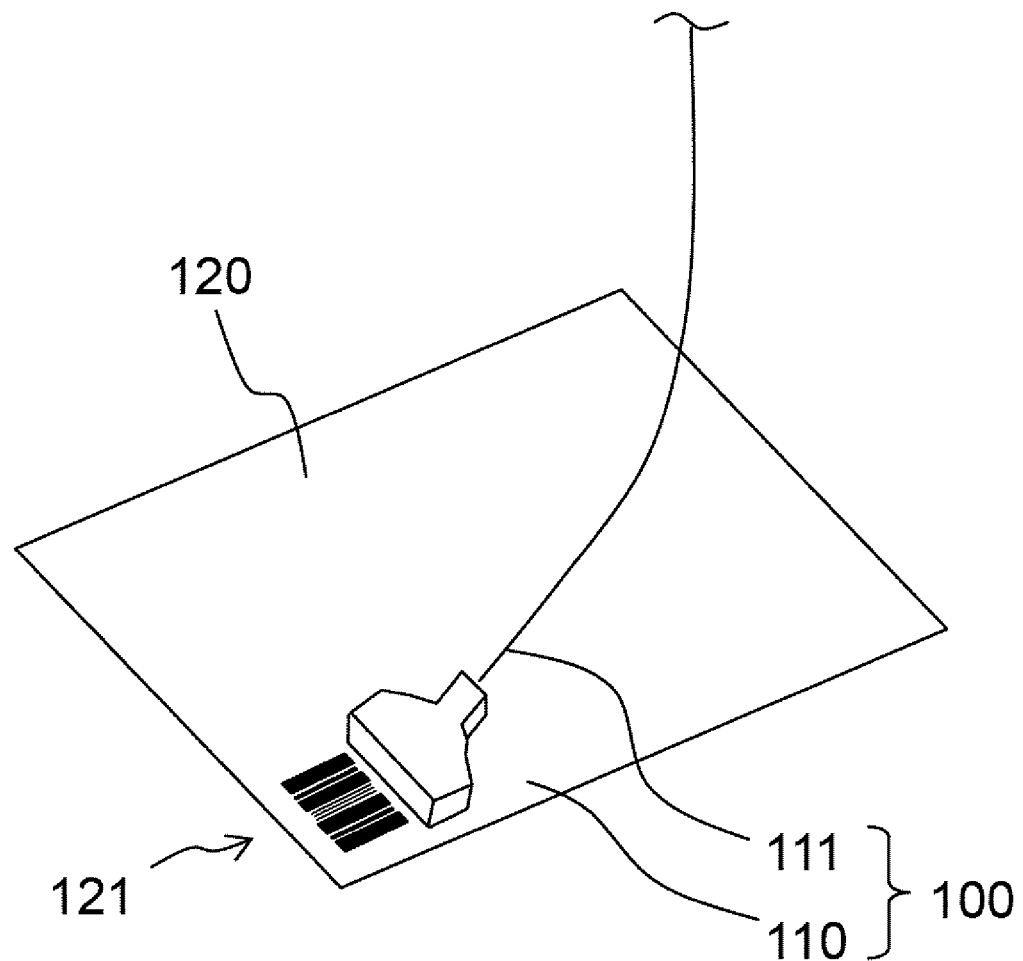
FIG. 1 is an illustration of an outside view of an exemplary information code reading device according to an embodiment of the present invention.
Figure 2A:
FIG. 2A is an illustration of an exemplary JAN code.
Figure 2B:
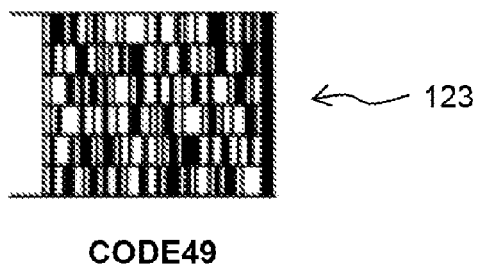
FIG. 2B is an illustration of an exemplary CODE 49.
Figure 2C:
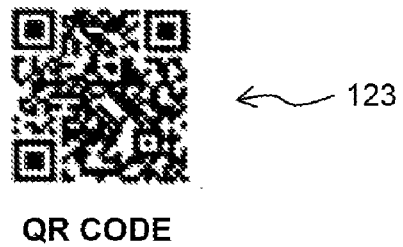
FIG. 2C is an illustration of an exemplary QR code.

FIG. 1 is an illustration of an outside view of an exemplary information code reading device 100 according to an embodiment of the present invention. FIG. 2A is an illustration of an exemplary JAN code, FIG. 2B is an illustration of an exemplary CODE 49, and FIG. 2C is an illustration of an exemplary QR code.

The information code reading device 100 comprises a main body 110 coupled to a processing device such as an electronic register (not shown) via a cable 111. The information code reading device 100 is operable to read an information code 121. The information code 121 may be, for example and without limitation, a symbol, or a code having different reflectivity printed on a reading object 120, and the like. For example, but without limitation, the information code 121 may be a one-dimensional barcode 122 (FIG. 2A) such as the JAN code, or a two-dimensional barcode 123 such as a stack-type CODE 49 (FIG. 2B) or a matrix type QR code (FIG. 2C), and the like.

Figure 3:
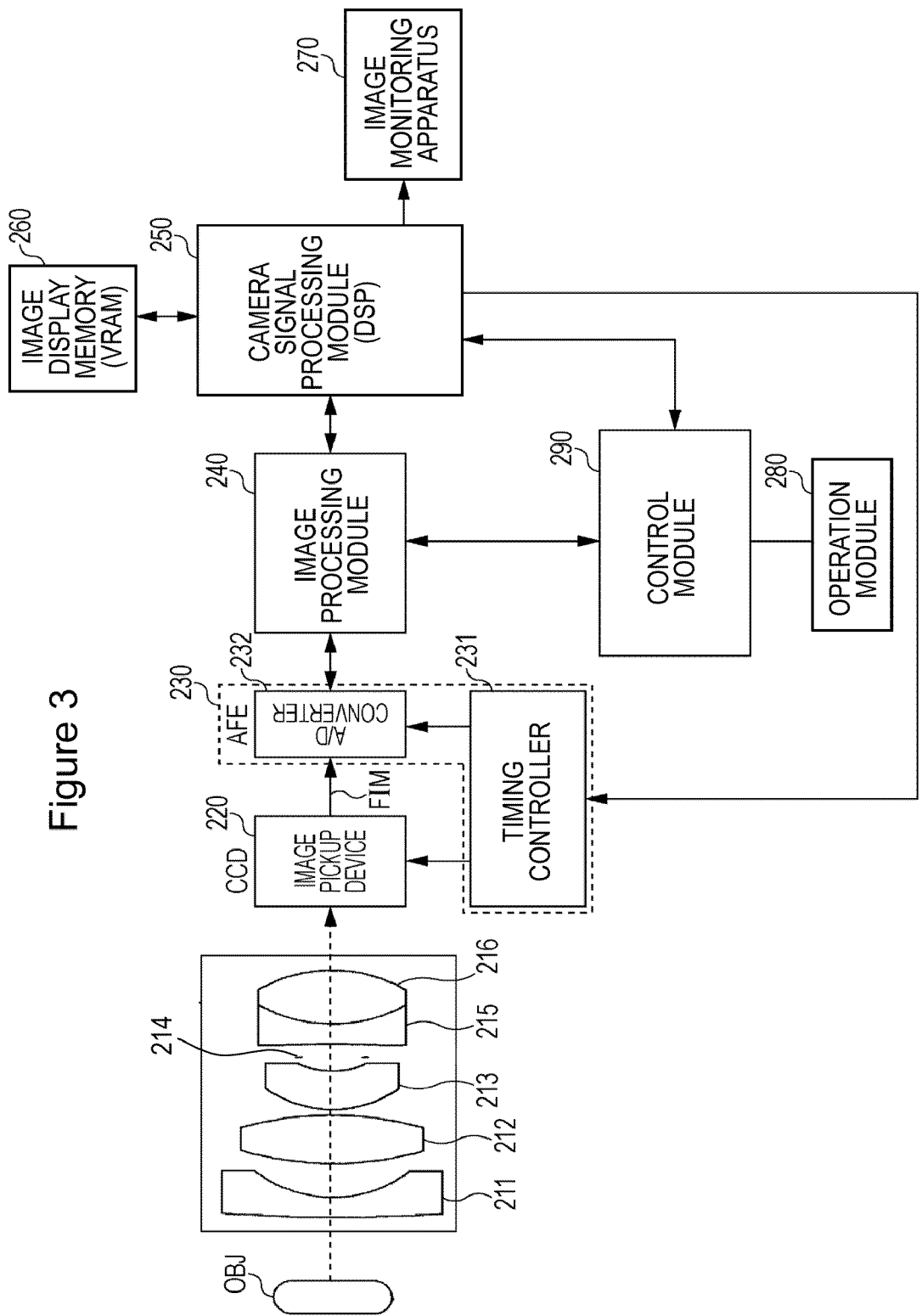
FIG. 3 is an illustration of a block diagram of an exemplary image pickup apparatus that can be used as the information code reading device of FIG. 1.

FIG. 3 is an illustration of a block diagram of an exemplary image pickup apparatus 200 that can be used as the information code reading device 100 of FIG. 1. An illumination light source (not shown) and an image pickup apparatus 200 shown in FIG. 3 can be arranged in the main body 110 of the information code reading device 100.

The image pickup apparatus 200 comprises an aberration control optical system 210 and an imaging element 220 (image pickup device 220). The image pickup apparatus 200 further comprises an analog front end module (AFE) 230, an image processing module 240, a camera signal processing module 250, an image display memory 260, an image monitoring module 270, an operation module 280, and a control module 290.

Figure 4A:
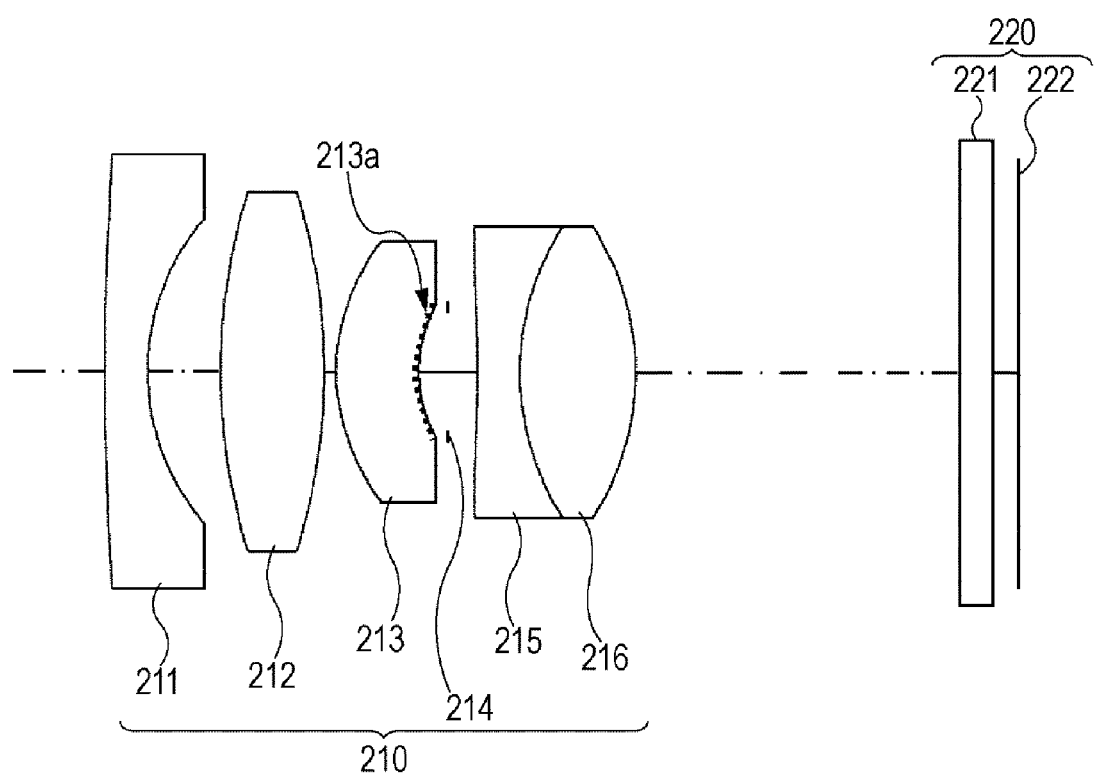
FIG. 4A is an illustration of an exemplary configuration of an imaging lens module comprised in an optical system according to one embodiment of the present invention.

FIG. 4 is an illustration of an exemplary configuration of an imaging lens module comprised in an optical system according to one embodiment of the present invention. An aberration control optical system 210 supplies a taken image of an object OBJ to an image pickup device 220. The aberration control optical system 210, comprises a first lens 211, a second lens 212, a third lens 213, a variable aperture stop 214, a fourth lens 215, and a fifth lens 216 arranged in that order from object side.

In the aberration control optical system 210, the fourth lens 215 and the fifth lens 216 are coupled to each other. That is, the lens unit of the aberration control optical system 210 comprises a cemented lens.

The aberration control optical system 210 serves as an optical system that employs an aberration control surface 213a having an aberration control function operable to intentionally produce aberration (i.e. coma aberration in an embodiment).

In an embodiment, an aberration control surface 213a can be used in order to produce a spherical aberration as an aberration control module. Alternatively, a separate aberration control element can serve as an aberration control module as described later. That is, an aberration control effect may be obtained by inserting a separate aberration control element.

In the embodiment shown in FIG. 4, the aberration control surface 213a (a surface R2 of the third lens 213) is provided in the aberration control optical system 210. In an embodiment, the aberration control surface 213a may be adjacent to the variable aperture stop 214. The aberration control surface 213a can have an aperture stop function.

In this document, the term "aberration control surface" refers to a lens surface having an aberration control effect similar to the aberration control element. The aberration control optical system 210 has an aberration characteristic that a depth of field extending effect (function) is maintained even when an aperture diameter of the variable aperture stop 214 changes.

The aberration control surface 213a produces an aberration in a light beam passing through the aberration control optical system 210, if a point-spread-function (PSF) of the light beam passing through the aberration control optical system 210 is substantially circular. If the aberration control surface 213a of the aberration control optical system 210 has a periodic shape having at least two periods in a circumferential direction, a point-spread-function (PSF) of the light beam passing through the aberration control optical system 210 can become substantially circular FIG. 4B is an illustration of an exemplary configuration of an imaging lens module of the optical system 210 according to an embodiment of the present invention.

Figure 4B:
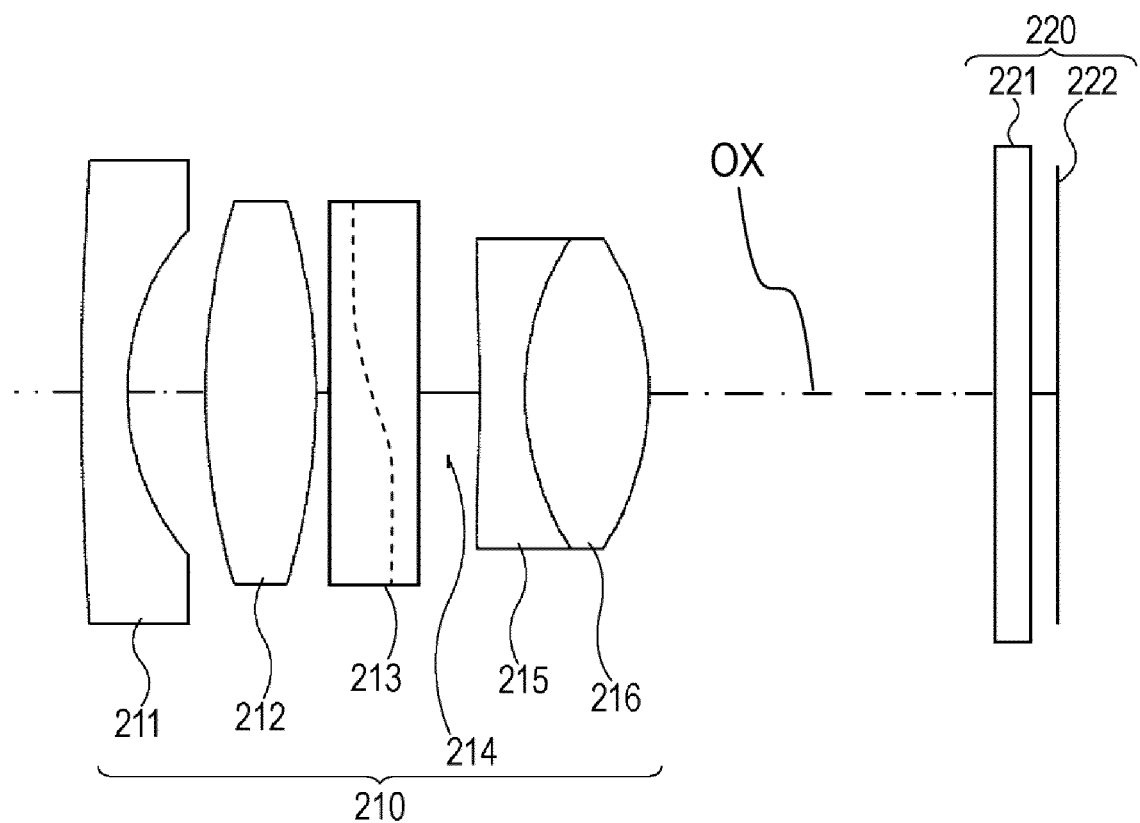
FIG. 4B is an illustration of an exemplary configuration of an imaging lens module comprised in the optical system according to one embodiment of the present invention.

An aberration control optical system 210 shown in FIG. 4B supplies a taken image of an object OBJ to an image pickup device 220. In the aberration control optical system 210, a first lens 211, a second lens 212, an externally dependent aberration control element 213 (third lens 213), a variable aperture stop 214, a fourth lens 215, and a fifth lens 216 are arranged from the object OBJ side. The fourth lens 215 and the fifth lens 216 are coupled to each other.

The aberration control optical system 210 is operable to intentionally produce aberration by employing an aberration control element having an aberration control function. The aberration control optical system 210 has an aberration characteristic that allows the aberration control function of the aberration control optical system 210 to change (is variable) in response to a change in an aperture diameter of the variable aperture stop 214.

In the aberration control optical system 210, at least one inflection point is provided in the refractive index of spherical aberration within the aperture diameter of the variable aperture stop 214, regardless of size of the aperture diameter.

The difference in refractive index of the inflection point from a center portion of an optical axis OX increases from the center portion toward a peripheral portion.

Further, the difference in refractive index of the inflection point from the center portion of the optical axis OX increases as the aperture diameter of the variable aperture stop 214 decreases.

The aberration control optical system 210 employs the externally dependent aberration control element 213 (third lens 213) as an element that can change the aberration control function (i.e., the aberration control function is variable) of the aberration control optical system 210 in response to a change in aperture diameter of the variable aperture stop 214.

The externally dependent aberration control element 213 is configured to perform independently. That is, the externally dependent aberration control element 213 is controlled from outside of the aberration control optical system 210. The externally dependent aberration control element 213 performs an aberration control function which can change aberration in image formation on a light receiving surface of the image pickup device 220. For example, but without limitation, the externally dependent aberration control element 213 can also control the degree of the change of the aberration including no change.

When a control module 290 exerts control so that the aberration control function of the externally dependent aberration control element 213 is not performed, the aberration control optical system 210 is brought into a single-focus state and provides high imaging performance. In contrast, when the control module 290 exerts control so that the aberration control function is performed, the aberration control optical system 210 is brought into a multi-focus state.

When the aberration control function of the externally dependent aberration control element 213 is performed, the degree of performance of the aberration control function is changed (is variable) under the control of the control module 290 in accordance with the change of the variable aperture stop 214.

Figure 4C:
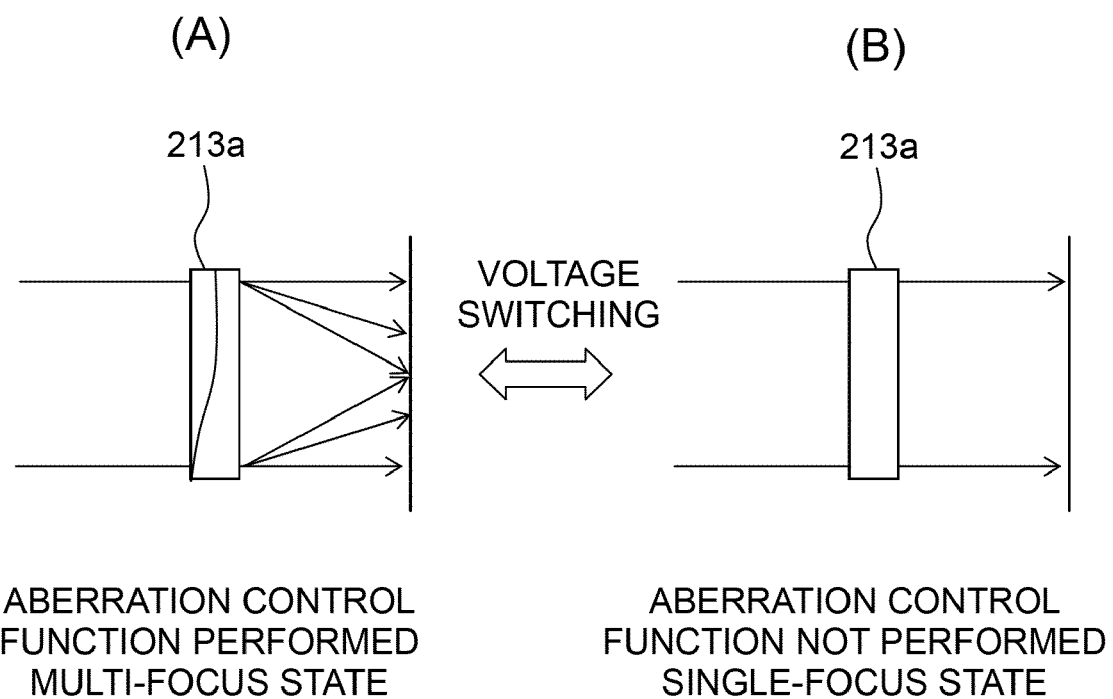
FIG. 4C is an illustration of a structure and function of the externally dependent aberration control element 213 according to an embodiment of the present invention.

FIG. 4C is an illustration of a structure and function of the externally dependent aberration control element 213 according to an embodiment of the present invention.

The externally dependent aberration control element 213 may comprise, for example but without limitation, a liquid crystal element (liquid crystal lens) 213a, as shown in FIG. 4C. By switching the voltage applied to the liquid crystal lens 213a, the light collecting state can be changed.

When a voltage is applied to the aberration control surface 213a such as the liquid crystal lens by the control module 290, for example, the aberration control surface 213a (liquid crystal lens) is controlled so as to perform the aberration control function, and the aberration control optical system 210 is brought into a multi-focus state, as shown in FIG. 4C (STATE 1).

In contrast, when voltage is not applied, or switched to a level lower than in the state in which the aberration control function is performed, by the control module 290, the aberration control surface 213a (liquid crystal lens) is controlled so as not to perform the aberration control function, and the aberration control optical system 210 is brought into a single-focus state, as shown in FIG. 4C (STATE 2).

In the state in which the aberration control function of the aberration control surface 213a (liquid crystal lens) is performed, the degree of performance of the aberration control function changes (is variable) in accordance with the change of the variable aperture stop 214 under the control of the control module 290.

Voltage applied to the aberration control surface 213a (liquid crystal lens) is changed to control the degree of performance of the aberration control function. The applied voltage can be changed, for example but without limitation, linearly, stepwise, or the like. In this manner, a multi-focus state of the aberration control surface 213a (liquid crystal lens) can change in response to the change in the applied voltage.

Figure 5:
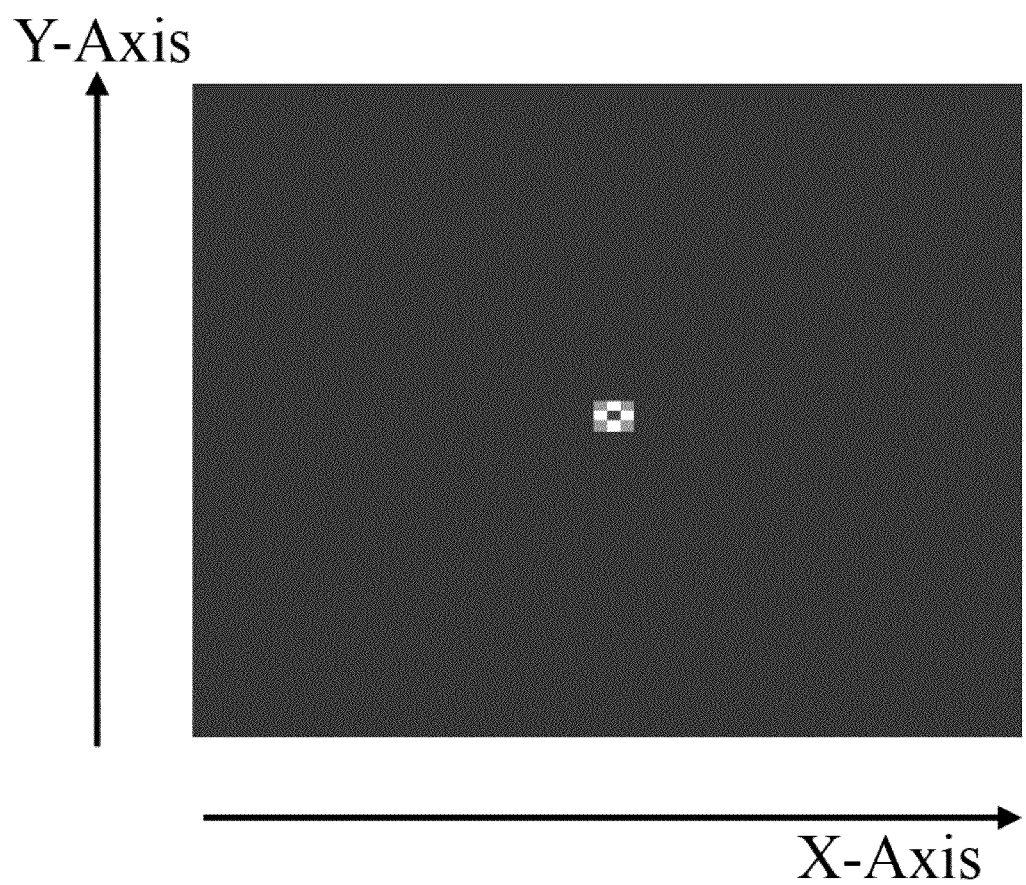
FIG. 5 is an illustration of a spot image of an aberration control optical system according to an embodiment of the present invention.
Figure 6:
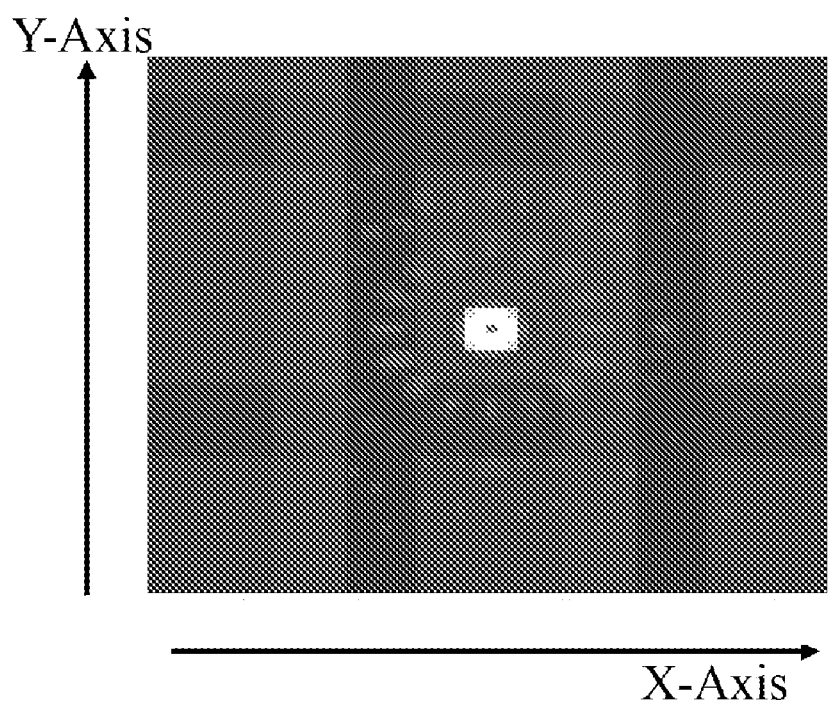
FIG. 6 is an illustration of a spot image of an existing optical system.

FIG. 5 is an illustration of a spot image of an aberration control optical system 210. FIG. 6 is an illustration of a spot image of an existing optical system. Comparison between FIGS. 5 and 6 shows that the aberration control optical system 210 diffuses the spot image.

In one embodiment, the aberration control surface 213a of the aberration control optical system 210 has a periodical shape defined by a continuous function of a combination of trigonometric waves, and has different focal lengths in arbitrary cross sections including the optical axis.

The aberration control surface 213a is based on the following relationships:

$$z = \alpha \times [\exp\{\beta(x2 \times y2)\} - 1] \times \cos\{n\theta\}, \text{ or}$$

$$z = \alpha \times [\exp\{\beta(x2 \times y2)\} - 1] \times \sin\{n\theta\}$$

where z is an optical axis of the aberration control optical system 210, x and y are two axes perpendicular to the optical axis and orthogonal to each other, $\alpha$, $\beta$, and n are coefficients, and $|x| \leq 1$, and $|y| \leq 1$.

The aberration control surface 213a of the aberration control optical system 210 can have a stepped periodical shape such that any of multiple focal lengths is provided in an arbitrary cross section including the optical axis.

Figure 7:
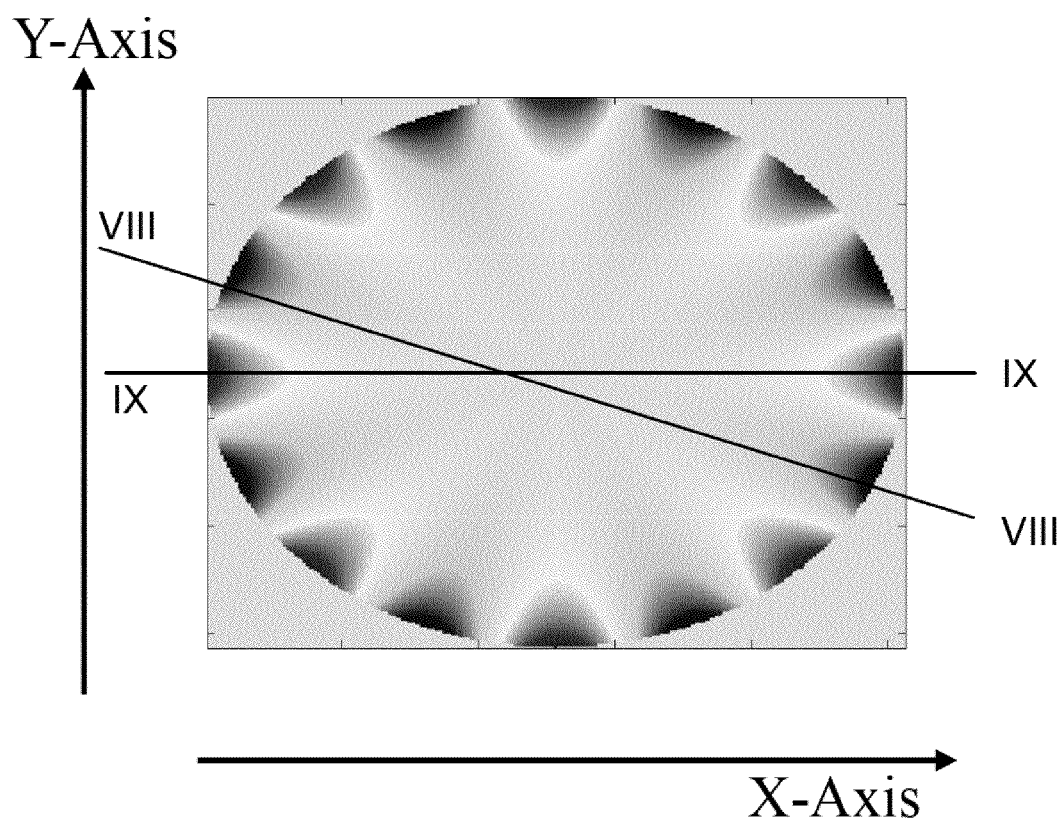
FIG. 7 is an illustration of a shape (cosine wave) of the aberration control surface of the aberration control optical system.
Figure 8:
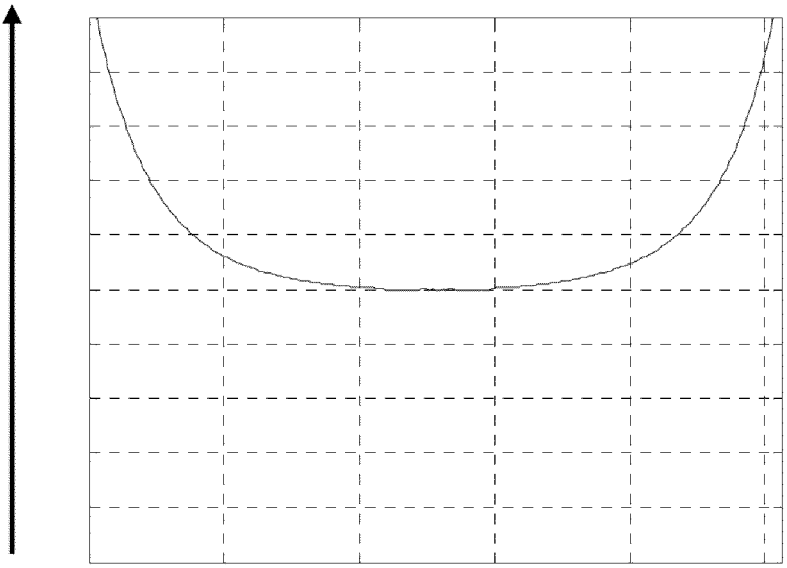
FIG. 8 is an illustration of a cross section of the aberration control surface of the aberration control optical system taken at VIII-VIII shown in FIG. 7.
Figure 9:
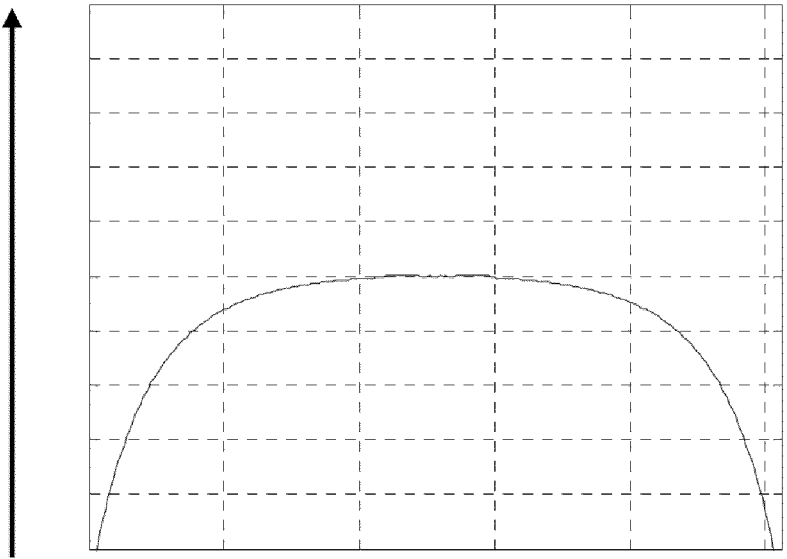
FIG. 9 is an illustration of a cross section of the aberration control surface of the aberration control optical system taken at IX-IX shown in FIG. 7.
Figure 10:
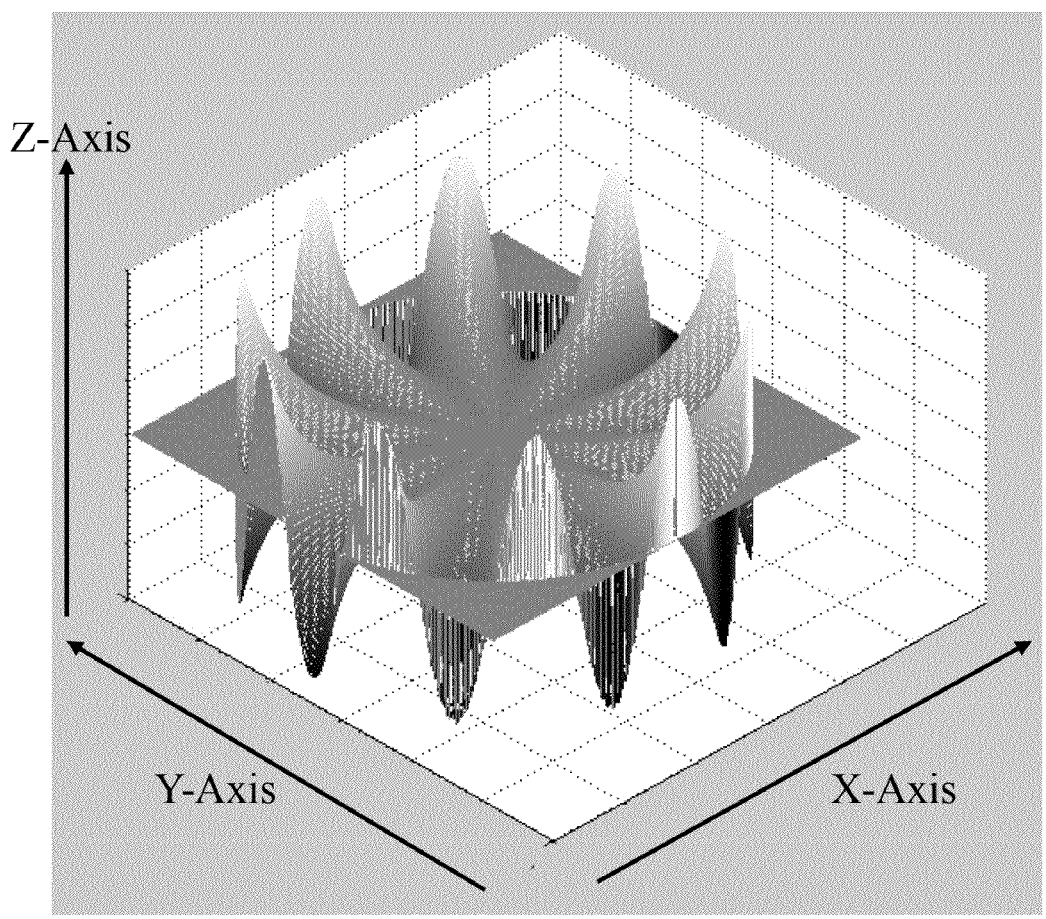
FIG. 10 is an illustration of the cross section of the aberration control surface of the aberration control optical system in more detail than FIGS. 8 and 9.

FIG. 7 is an illustration of a shape (cosine wave) of the aberration control surface 213a of the aberration control optical system. FIG. 8 is an illustration of a cross section of the aberration control surface of the aberration control optical system 210 taken at VIII-VIII shown in FIG. 7. FIG. 9 is an illustration of a cross section of the aberration control surface 213a of the aberration control optical system 210 taken at IX-IX shown in FIG. 7. FIG. 10 is an illustration of a cross section of the aberration control surface 213a of the aberration control optical system 210 in more detail than FIGS. 8 and 9.

Figure 11:
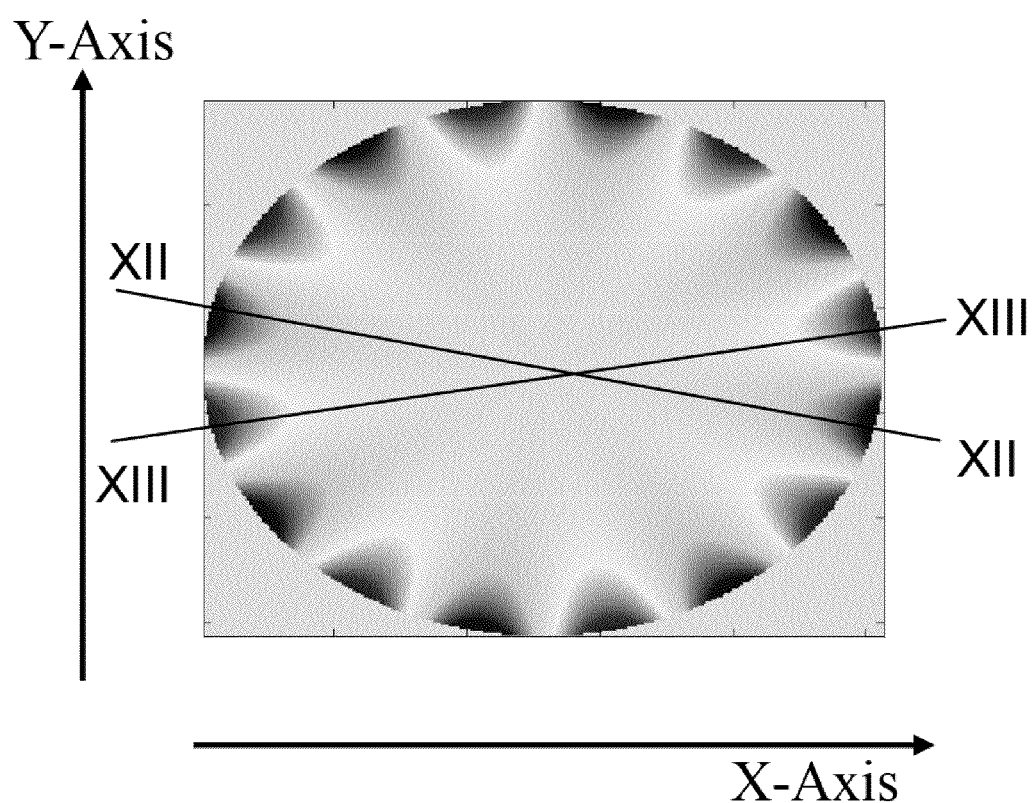
FIG. 11 is an illustration of a shape (sine wave) of the aberration control surface of the aberration control optical system.
Figure 12:
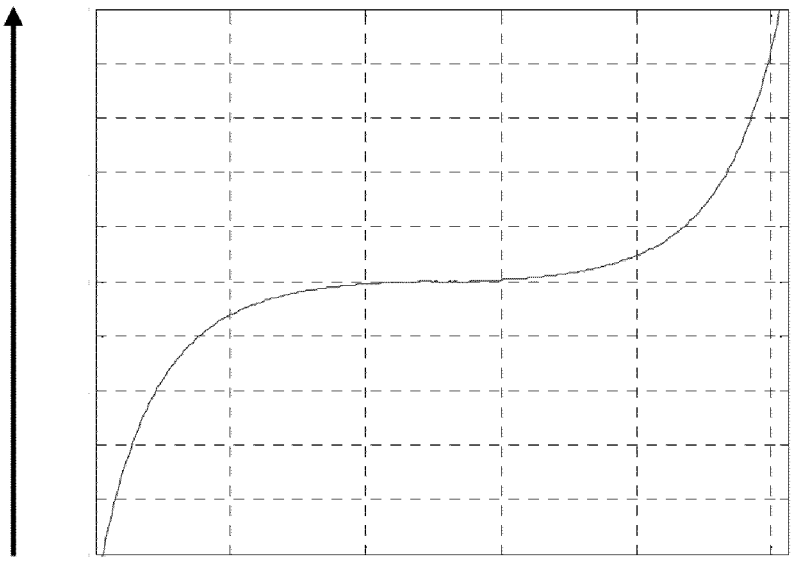
FIG. 12 is an illustration of a cross section of the aberration control surface of the aberration control optical system taken at XII-XII shown in FIG. 11.
Figure 13:
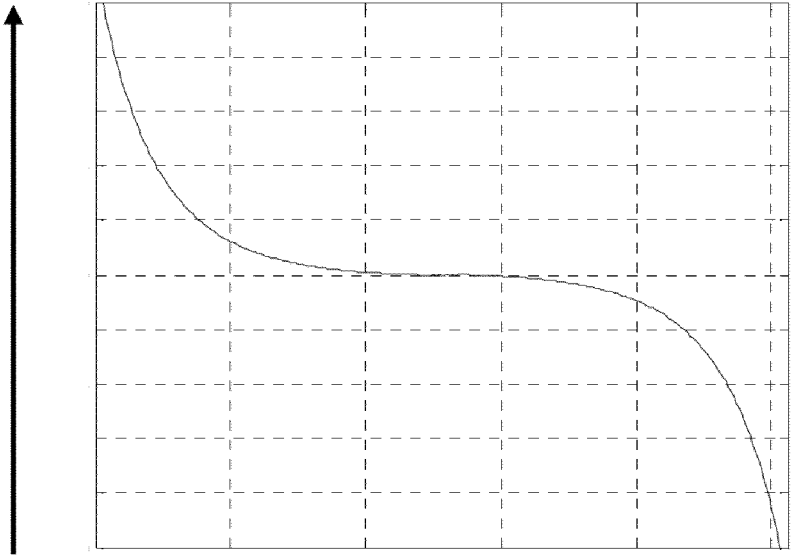
FIG. 13 is an illustration of a cross section of the aberration control surface of the aberration control optical system taken at XIII-XIII shown in FIG. 11.
Figure 14:
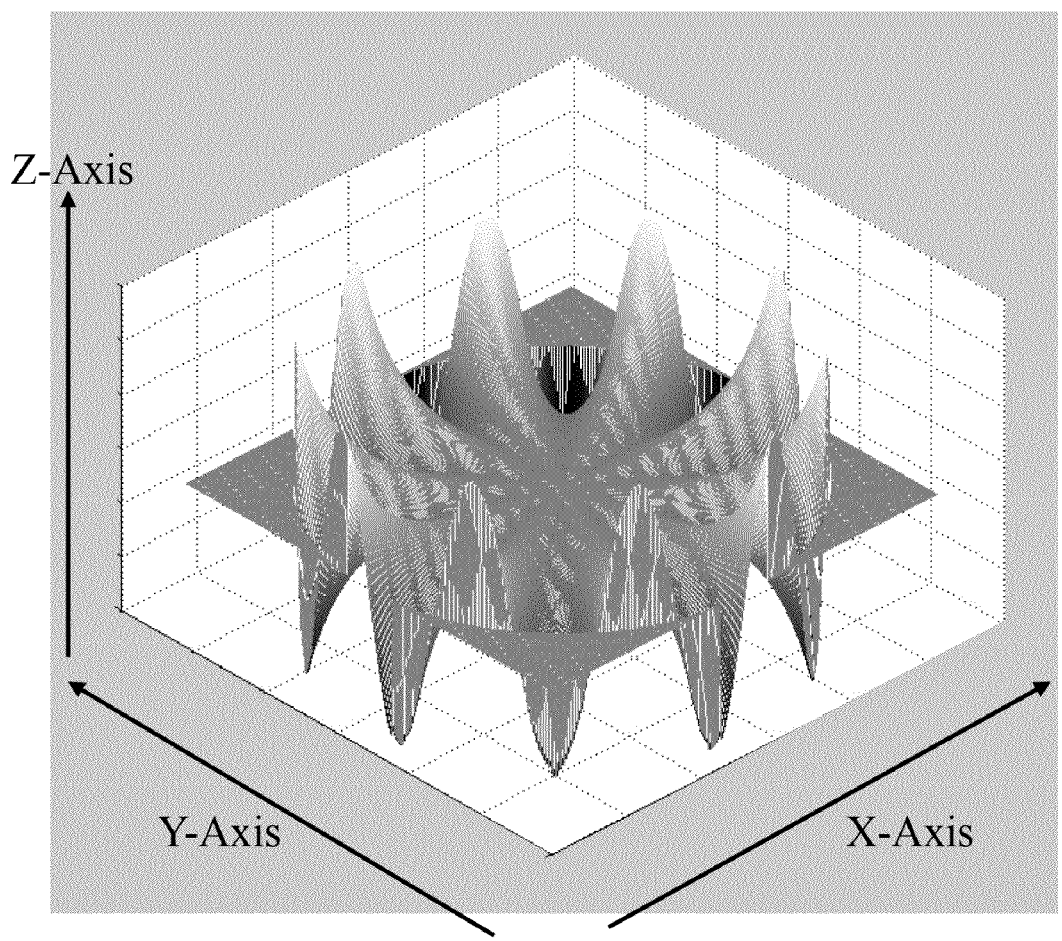
FIG. 14 is an illustration of the cross section of the aberration control surface of the aberration control optical system in more detail than FIGS. 12 and 13.
Figure 15:
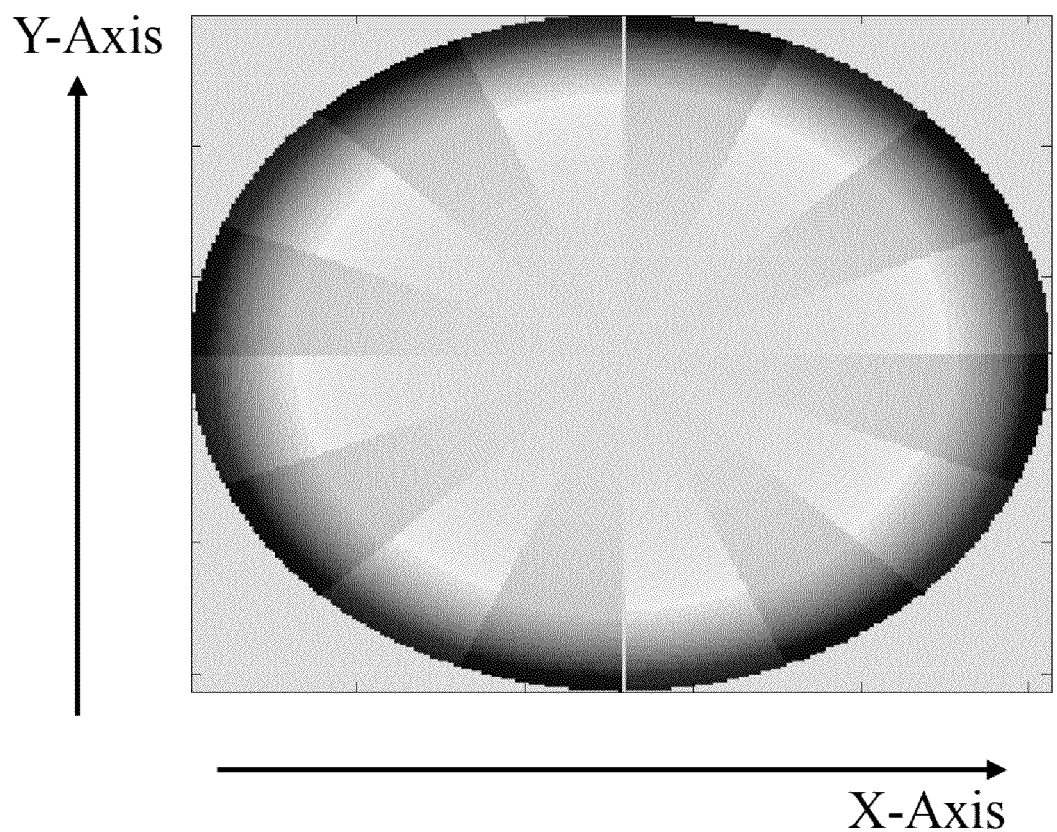
FIG. 15 is an illustration of a shape (sine wave) of the aberration control surface of the aberration control optical system when a periodical shape of the aberration control surface is defined by a rectangular wave.

FIG. 11 is an illustration of a shape (sine wave) of the aberration control surface 213a of the aberration control optical system 210. FIG. 12 is an illustration of a cross section of the aberration control surface 213a of the aberration control optical system 210 taken at XII-XII shown in FIG. 11. FIG. 13 is an illustration of a cross section of the aberration control surface 213a of the aberration control optical system 210 taken at XIII-XIII shown in FIG. 11. FIG. 14 is an illustration of the cross section of the aberration control surface 213a of the aberration control optical system 210 shown in more detail than FIGS. 12 and 13. FIG. 15 is an illustration of a shape (sine wave) of the aberration control surface of the aberration control optical system when the periodical shape of the aberration control surface 213a is defined by a rectangular wave.

As described above, in the aberration control optical system 210, a number of periods of the aberration control surface 213a having a periodical structure is controlled in accordance with a solid-state image pickup device such as the image pickup device 220. The number of periods depends on a pixel pitch and pixel shape (e.g., a square pixel or a honeycomb-shaped pixel) of the solid-state image pickup device. In this case, the periodical structure may be any of the cosine wave, sine wave, and rectangular wave, as shown in FIGS. 7 to 14.

Depth of field extension is performed by the periodical structure including both a plurality of independent focal lengths (e.g., two values of rectangular waves) and a focal length having a certain continuous width (sine wave, cosine wave).

Since the aberration control surface 213a has a rotationally asymmetric shape and has a periodical structure including an increased number of periods, the PSF can be made substantially circular. This realizes efficient depth of field extension.

In a case in which a plurality of focal lengths are concentrically provided, unless the pitch is infinitely decreased, weights of the focal lengths differ from when the first focal length is provided in the center portion and when the first focal length is provided in the peripheral portion.

In other words, the production sensitivity is substantially high, and weight is biased to the far side and the close side even by a minute error.

When multiple foci are realized by the radial shape, not by the concentric shape, the difficulty in production may increase, but the sensitivity to manufacturing variations decreases and productivity increases.

When the number of periods is increased, the PSF can be made substantially circular by utilizing the sampling effect of the pixels of the image pickup device 220. Since the PSF is circular, the image is naturally blurred in an out-of-focus state. Further, a size of a filter used for image restoration can be reduced by utilizing the symmetrical property of the circular PSF.

Figure 16A:
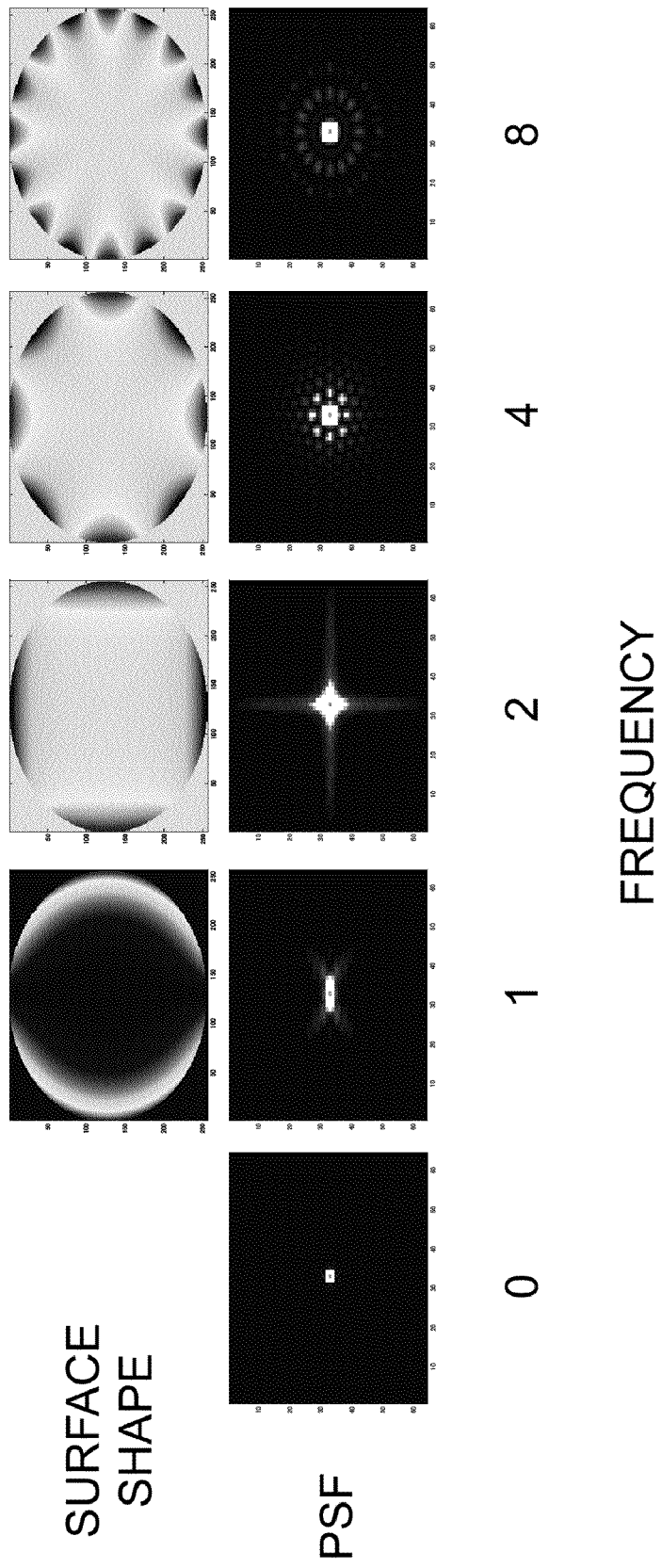
FIGS. 16A and 16B show the relationship between a number of periods and a point-spread-function (PSF) shape.
Figure 16B:
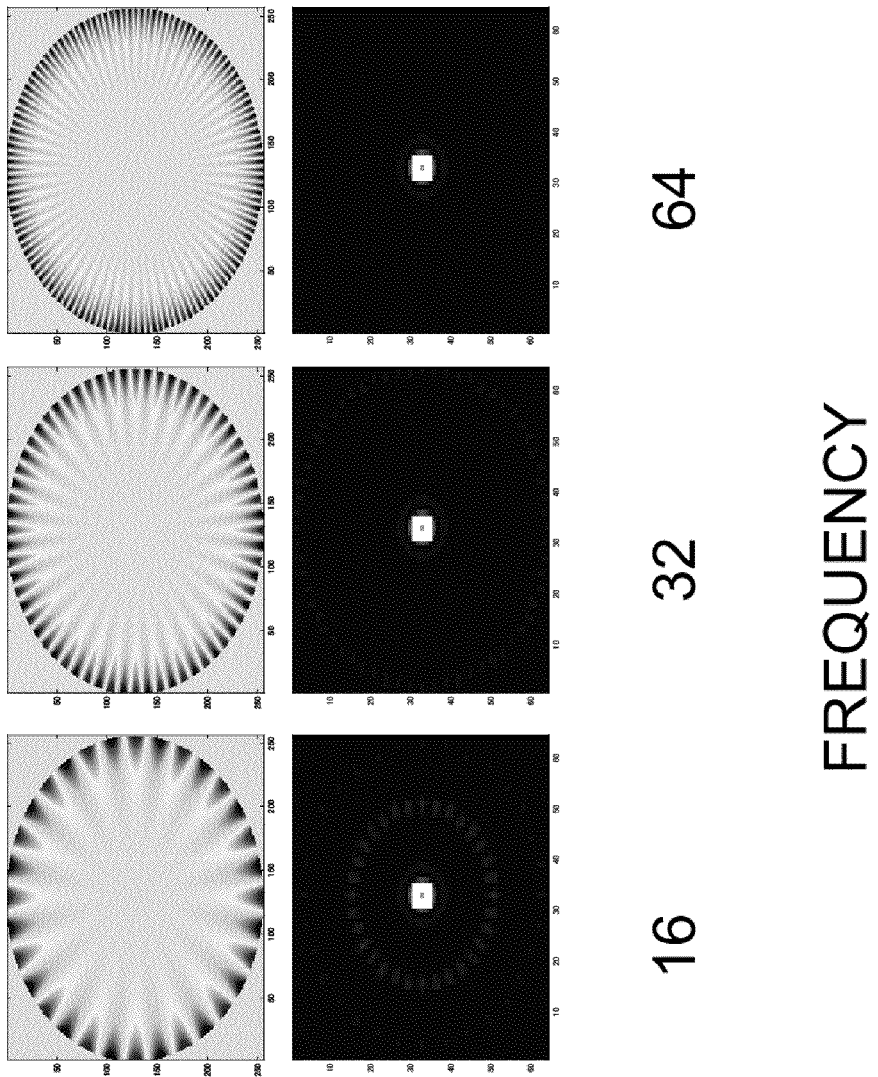
Figure 17:
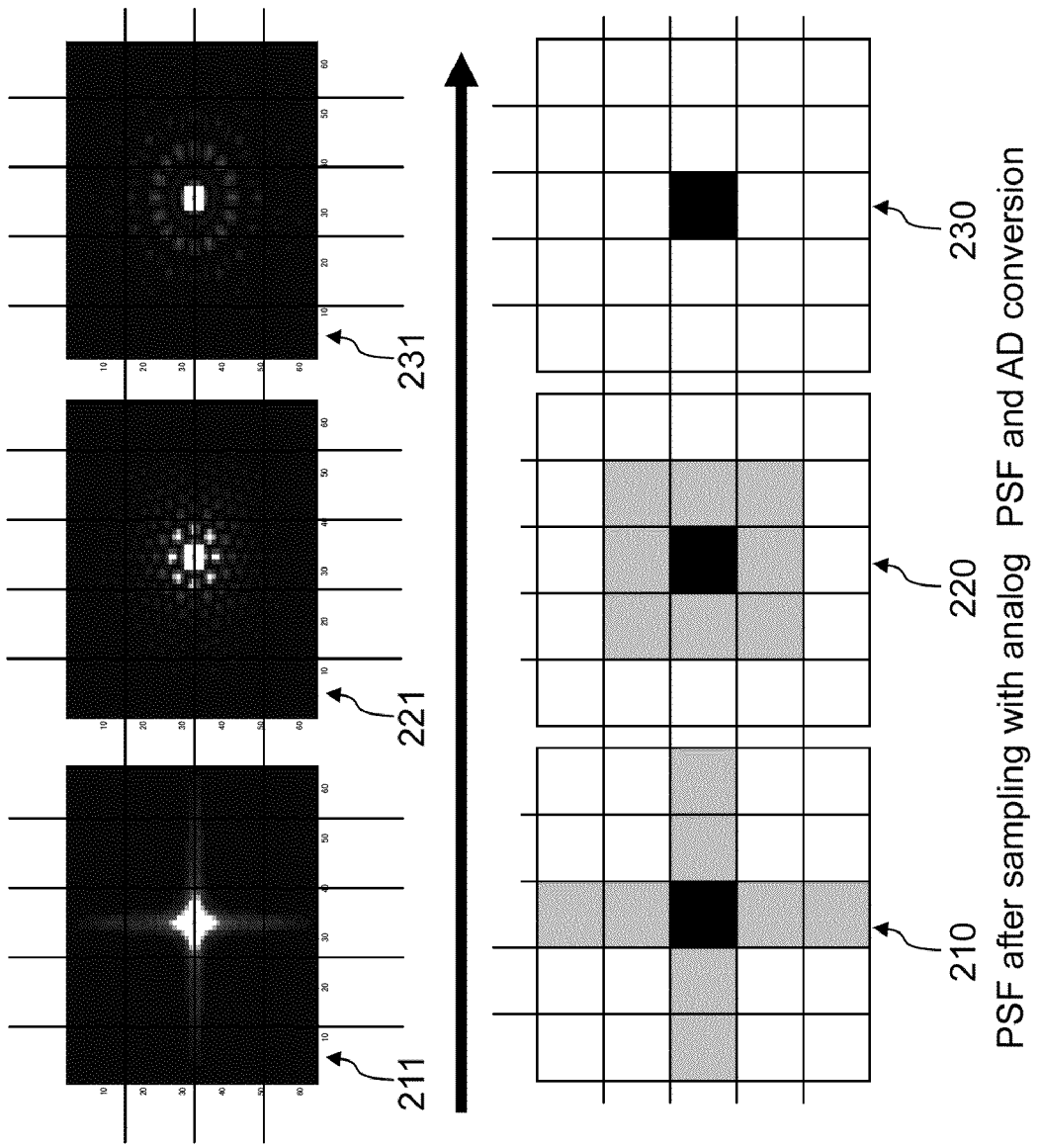
FIG. 17 shows analog PSFs and PSFs sampled by ND conversion.

FIGS. 16A and 16B show the relationship between the number of periods and the PSF shape. FIG. 17 shows analog PSFs and PSFs sampled by A/D conversion.

As shown in FIGS. 16A, 16B and 17, if the aberration control surface 213a has a rotationally asymmetric shape and a periodical structure, the PSF can be made substantially circular by increasing the number of periods. In this manner, an efficient depth of field extension is obtained.

The imaging element 220 (FIG. 4A) has a plane parallel plate made of glass (cover glass) 221, and an imaging plane 222 of the imaging element 220 arranged in order from the fifth lens 216 side. The light from the subject OBJ through the aberration control optical system 210 is imaged on the imaging plane 222 of the imaging element 220. A subject dispersed image imaged with the imaging element 220 is not focused on the imaging element 220 by the aberration control surface 213a, and is an image formed with a light flux of deep depth of field and blurred portion.

Referring to FIG. 3, the image pickup device 220 may include a CCD or a CMOS sensor on which the image received from the aberration control optical system 210 is formed and which outputs first image information representing the image formed thereon to the image processing module 240 via the AFE unit 230 as a first image electric signal (FIM).

The AFE unit 230 may include a timing controller 231 and an analog/digital (A/D) converter 232. The timing controller 231 controls timing for driving the CCD in the image pickup device 220. The A/D converter 232 converts an analog signal input from the CCD into a digital signal, and can output the thus-obtained digital signal to the image processing module 240.

The image processing module 240 can receive the digital signal representing the picked-up image from the AFE unit 230, subject the signal to an image processing process such as edge enhancement process and the like, improve the contrast which is lowered by the aberration control optical system 210, and output the result to the signal processing module 250 (e.g., a digital signal processor (DSP)).

The camera signal processing module (or the digital signal processor (DSP)) 250 is operable to perform, without limitation, processes including color interpolation, white balancing, YCbCr conversion, compression, filing, etc., stores data in the memory 260, and displays images on the image monitoring module 270.

The control module 290 is operable to perform exposure control, receive operation inputs from the operation module 280 and the like, and determine the overall operation of the system 200 on the basis of the received operation inputs. Thus, the control module 290 can control the AFE unit 230, the image processing module 240, DSP 250, the aperture stop 214, and the like, to suitably perform aberration control of the system 200.

The image processing module 240 also performs an image processing process, for example but without limitation, including edge emphasis and the like such as MTF correction process, and the like. Then the image processing module 240 performs a process to improve contrast which has low value caused by the aberration control optical system 201. Accordingly, a final high-definition image produced by the image processing module 240 can be controlled.

Figure 18:
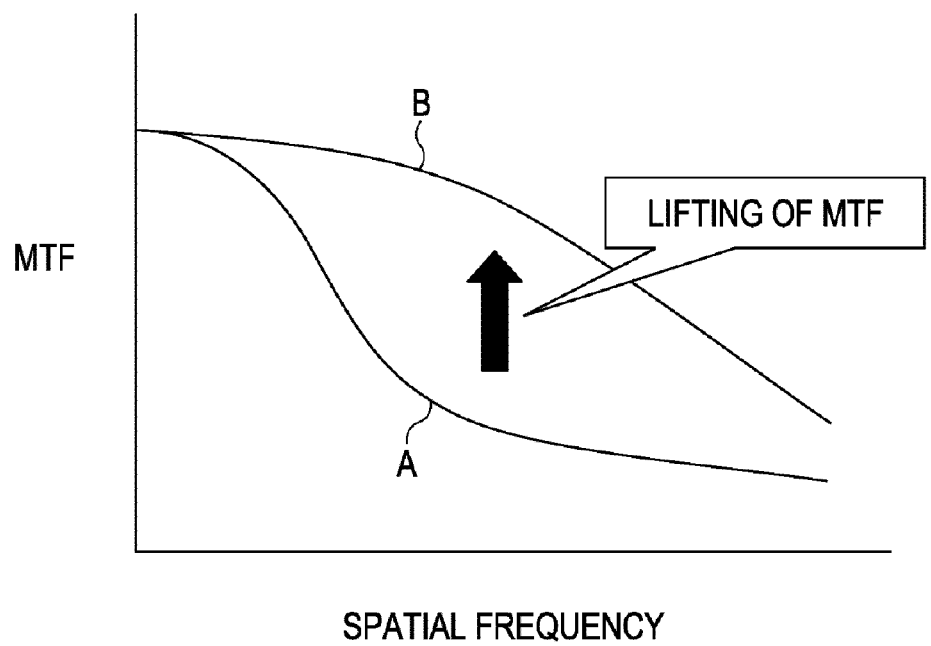
FIG. 18 is an illustration of an exemplary diagram showing a modulation transfer function (MTF) correction process performed by an image processing device according to an embodiment of the invention.

FIG. 18 is an exemplary diagram illustrating an MTF correction process performed by image processing module 240 according to an embodiment of the invention. In the MTF correction process performed by the image processing module 240, the MTF of the first image, which is low as shown by curve A in FIG. 18, is changed to an MTF closer to, or the same as, that shown by curve B in FIG. 18 by performing post-processing. The post-processing, may comprise, for example but without limitation, edge emphasis, chroma emphasis, and the like using the spatial frequency as a parameter. The characteristic shown by the curve B in FIG. 18 is obtained when, for example, the wavefront shape is not changed without using the aberration controller such as an aberration control surface 213a of the of the present embodiment. In the present embodiment, the corrections are performed using the spatial frequency as a parameter.

Figure 19:
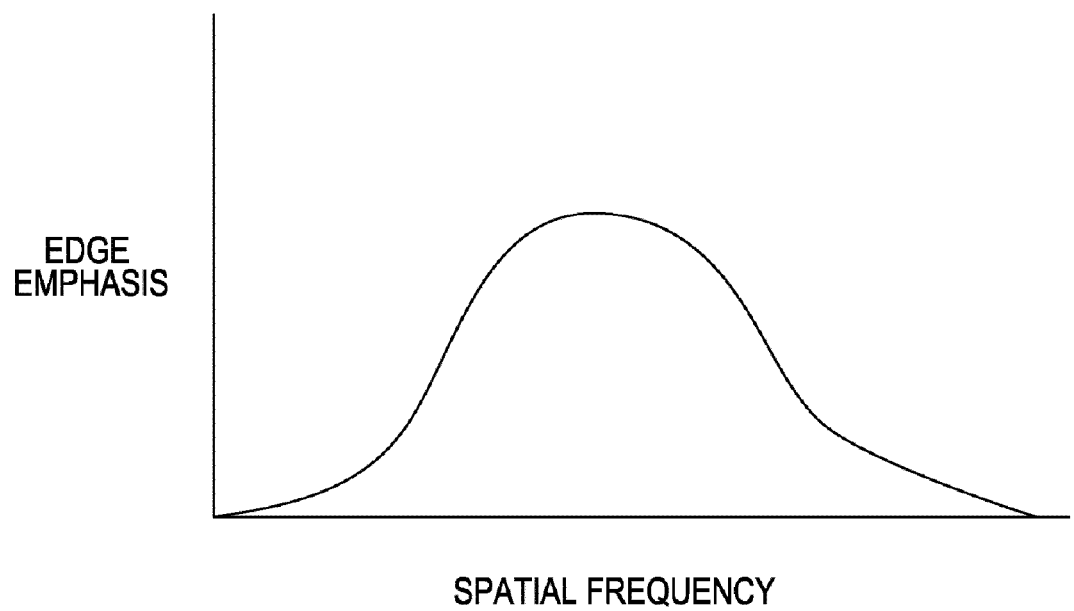
FIG. 19 is an illustration of an exemplary diagram showing the MTF correction process performed by the image processing device according to an embodiment of the invention.

According to an embodiment, in order to obtain the final MTF characteristic curve B from the optically obtained MTF characteristic curve A with respect to the special frequency as shown in FIG. 18, the original image (first image) can be corrected by performing edge emphasis, or the like for each spatial frequency as shown in FIG. 19. For example, the MTF characteristic shown in FIG. 18 is processed with an edge emphasis curve with respect to the spatial frequency shown in FIG. 19.

More specifically, in a predetermined spatial frequency range, the degree of edge emphasis is reduced at a low-frequency side and a high-frequency side and is increased in an intermediate frequency region. Accordingly, the desired MTF characteristic curve B can be virtually obtained.

The image pickup apparatus 200 (imaging device 200) according to the present embodiment includes the aberration control optical system 210 and the image pickup device 220 (imaging element 220) for obtaining the first image, and also includes the image processing module 240 for forming the final high-definition image from the first image. The aberration control optical system 210 is provided with an aberration control surface 213a or an optical element, such as, without limitation, a glass element and a plastic element, having a surface processed so as to control an aberration, so that the wavefront of light can be changed (modulated). The light with the modulated wavefront forms an image, i.e., the first image, on the imaging plane (light-receiving surface) of the image pickup device 220.

An MTF response of the present embodiment and that of a typical optical system are discussed below.

Figure 20:
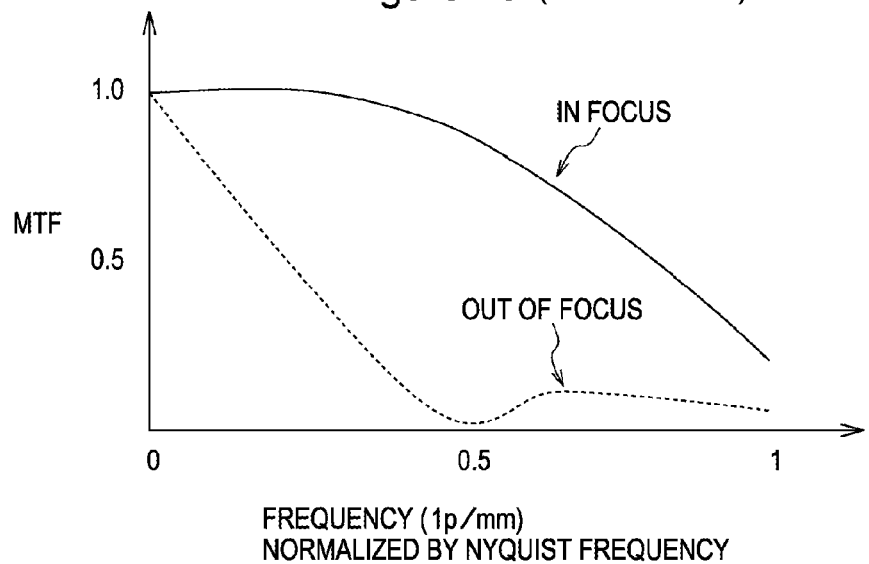
FIG. 20 is an illustration of an exemplary diagram illustrating the MTF response obtained when an object is in focus and when the object is out of focus in the typical optical system.
Figure 21:
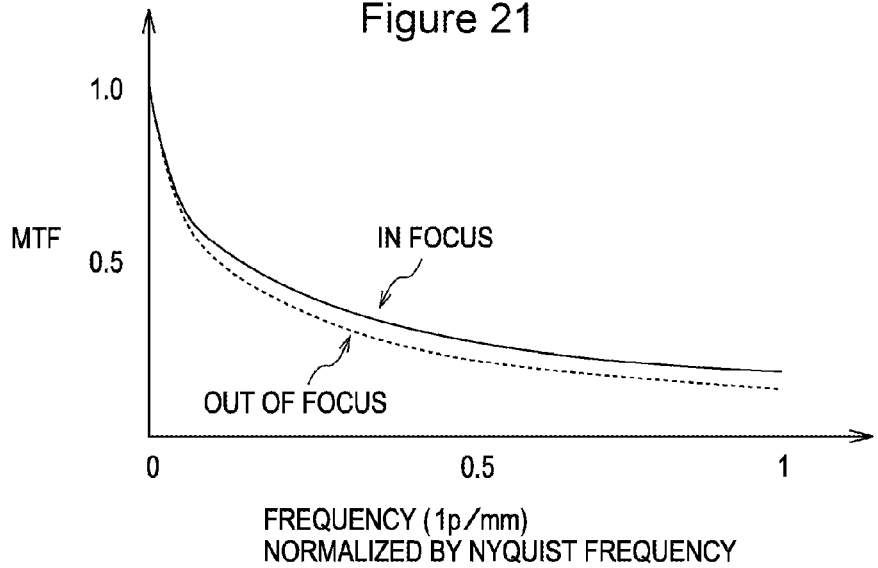
FIG. 21 is an illustration of an exemplary diagram illustrating the MTF response obtained when an object is in focus and when the object is out of focus in an optical system including the aberration controller according to an embodiment of the invention.

FIG. 20 is an illustration of an exemplary diagram illustrating the MTF response obtained when an object is in focus and when the object is out of focus in the typical optical system. FIG. 21 is an illustration of an exemplary diagram illustrating the MTF response obtained when an object is in focus and when the object is out of focus in the image pickup apparatus 200 comprising the aberration control optical system 210 according to an embodiment of the invention. FIG. 22 is an illustration of an exemplary diagram illustrating the MTF response obtained after image processing in the image pickup apparatus according to an embodiment of the invention.

As shown in FIGS. 20 to 22, in the aberration control optical system 210 including the aberration control surface 213a (aberration controller), variation in the MTF response obtained when the object is out of focus is smaller than that in an optical system without the control surface 213a. The MTF response can be increased by subjecting the image formed by the optical system including the aberration control surface 213a to an image processing using the image processing module 240.

However, if the noise increases when the image processing is performed, the image processing that may enhance the response of the MTF may not be suitably performed. In the present embodiment, the aberration control optical system 210 is referred to as the aberration control optical system 210 since it controls the aberration.

As described below, the OTF (MTF) value for the optical system including an aberration-controller is preferably about 0.1 or more at the Nyquist frequency shown in FIG. 21. In order to obtain the OTF shown in FIG. 18 after image processing, gain is increased by the image processing. However, sensor noise is also increased. Therefore, preferably, the image processing is performed without largely increasing the gain in a high-frequency range around the Nyquist frequency. In an optical system, sufficient resolution can be obtained if the MTF value at the Nyquist frequency is about 0.1 or more. Therefore, if the MTF value is at least about 0.1 before image processing, it is not necessary to increase the gain at the Nyquist frequency by image processing. If the MTF value is less than about 0.1 before image processing, the image after image processing is largely influenced by noise. That is not preferable.

As described above, if the aberration control surface 213a of the aberration control optical system 210 has a rotationally asymmetric periodic shape with two or more periods in the circumferential direction, a PSF of a light beam passing through the aberration control optical system 210 can become substantially circular.

The periodical shape of the aberration control surface 213a of the aberration control optical system 210 can be defined by a continuous function of a combination of trigonometric waves, and has different focal lengths in arbitrary cross sections including the optical axis.

Alternatively, the aberration control surface 213a of the aberration control optical system 210 can have a stepped periodical shape such that any of multiple focal lengths is provided in an arbitrary cross section including the optical axis.

According to an embodiment of the present invention, if the aberration control surface 213a has a rotationally asymmetric shape that has a periodicity in the circumferential direction (radial shape), an obtained PSF can be rotationally asymmetric, but be substantially circular. The sensitivity to production variations can be suppressed by the rotationally asymmetric shape, and the size of the filter that is inevitably large can be reduced by the periodicity.

In this case, even when the distance from the aberration control optical system 210 to the object differs, the PSF focused on the solid-state image pickup device such as the image pickup device 220 is in a multifocal state or a soft focus state, and almost the same state is obtained. Thus, the aberration control surface 213a can have a shape that allows image restoration to be performed with a single filter, regardless of an object distance.

Hence, even when the distance from the aberration control optical system to the object differs, the PSF focused on the solid-state image pickup device is in a multifocal state or a soft focus state, and almost the same state is obtained. Thus, image restoration can be performed with the single filter, regardless of the object distance.

In other words, for extending the depth of field in the imaging device 200, the size of the filter used for image restoration can be reduced while suppressing the sensitivity to variations in manufacturing.

By properly controlling coma aberration, depth of field extension can be performed without image restoration, and an image of an appropriate quality that is rarely affected by noise can be obtained.

In addition, it is possible to obtain a natural image without using an expensive and large optical lens that is difficult to produce and without driving the lens.

It is also possible to simplify the configuration of the aberration control optical system 210, to facilitate production, and to achieve cost reduction. Therefore, the imaging device 200 can be applied to a compact, light weight, and low cost commercial off-the-shelf device. As explained above, such electronic devices may be, without limitation, a digital still camera, a mobile phone camera, a Personal Digital Assistant (PDA) camera, a camera used for a vehicle, an image inspection apparatus, an industrial camera used for automatic control, and the like.

While at least one exemplary embodiment has been presented in the foregoing detailed description, the invention is not limited to the above-described embodiment or embodiments. Variations may be apparent to those skilled in the art. In carrying out the invention, various modifications, combinations, sub-combinations and alterations may occur in regard to the elements of the above-described embodiment insofar as they are within the technical scope of the invention or the equivalents thereof. The exemplary embodiment or exemplary embodiments are examples, and are not intended to limit the scope, applicability, or configuration of the invention in any way. Rather, the foregoing detailed description will provide those skilled in the art with a template for implementing the exemplary embodiment or exemplary embodiments. It should be understood that various changes can be made in the function and arrangement of elements without departing from the scope of the invention as set forth in the appended claims and the legal equivalents thereof. Furthermore, although embodiments of the invention have been described with reference to the accompanying drawings, it is to be noted that changes and modifications may be apparent to those skilled in the art. Such changes and modifications are to be understood as being comprised within the scope of the invention as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items in the grouping be present, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A lens unit, comprising:
a plurality of lenses;
an aberration control module operable to produce an aberration in a light beam passing through the lens unit to obtain a depth of field extension effect if a point-spread-function of the light beam passed through the lens unit becomes substantially circular, wherein the aberration control module is based on the following relationship:

$$z=\alpha \times [\exp\{\beta(x^2 x y^2)\}-1] \times \cos\{n\theta\},$$

where z is an optical axis of the lens unit, x and y are orthogonal axes perpendicular to the optical axis, $|x| \leq 1$, and $|y| \leq 1$, $\alpha$, $\beta$, and n are coefficients.

2. The lens unit according to claim 1, wherein the point-spread-function of the light beam is substantially circular if the aberration control module has a rotationally asymmetric shape with at least two periods in a circumferential direction.

3. The lens unit according to claim 1, wherein the lens unit comprises an aperture stop and the aberration control module is adjacent to the aperture stop.

4. The lens unit according to claim 1, wherein the aberration control module comprises a function of an aperture stop.

5. The lens unit according to claim 2, wherein the rotationally asymmetric shape is defined by a continuous function of a combination of trigonometric waves.

6. The lens unit according to claim 5, wherein the rotationally asymmetric shape has different focal lengths in arbitrary cross sections including an optical axis.

7. The lens unit according to claim 2, wherein the rotationally asymmetric shape is a stepped periodical shape.

8. The lens unit according to claim 7, wherein the rotationally asymmetric shape comprises one of multiple focal lengths provided in an arbitrary cross section including an optical axis.

9. A lens unit, comprising:
a plurality of lenses;
an aberration control module operable to produce an aberration in a light beam passing through the lens unit to obtain a depth of field extension effect if a point-spread-function of the light beam passed through the lens unit becomes substantially circular;
wherein the aberration control module is based on the following relationship:

$$z = \alpha \times [\exp\{\beta(x^2 x y^2)\} - 1] \times \sin\{n\theta\},$$

where z is an optical axis of the lens unit, x and y are orthogonal axes perpendicular to the optical axis, $|x| \leq 1$, and $|y| \leq 1$, $\alpha$, $\beta$, and n are coefficients.

10. An image pickup apparatus, comprising:
a lens unit comprising:
a plurality of lenses;
an aberration control module operable to produce an aberration in a light beam passing through the lens unit to obtain a depth of field extension effect if a point-spread-function of the light beam passed through the lens unit becomes substantially circular, wherein the aberration control module is based on the following relationship:

$$z = \alpha \times [\exp\{\beta(x^2 x y^2)\} - 1] \times \cos\{n\theta\},$$

where z is an optical axis of the lens unit, x and y are orthogonal axes perpendicular to the optical axis, $|x| \leq 1$, and $|y| \leq 1$, $\alpha$, $\beta$, and n are coefficients; and
an image pickup device operable to capture an object image in the light beam.

11. The image pickup apparatus according to claim 10, wherein the point-spread-function of the light beam is substantially circular if the aberration control module in the lens unit has a rotationally asymmetric shape with at least two periods in a circumferential direction.

12. The image pickup apparatus according to claim 11, wherein the rotationally asymmetric shape is defined by a continuous function of a combination of trigonometric waves.

13. The image pickup apparatus according to claim 11, wherein the rotationally asymmetric shape has different focal lengths in a plurality of arbitrary cross sections including an optical axis.

14. The image pickup apparatus system according to claim 11, wherein the rotationally asymmetric shape is a stepped periodical shape.

15. An electronic device comprising an image pickup apparatus, wherein the image pickup apparatus comprises:
a lens unit comprising:
a plurality of lenses;
an aberration control module operable to produce an aberration in a light beam passing through the lens unit to obtain a depth of field extension effect if a point-spread-function of the light beam passed through the lens unit becomes substantially circular, wherein the aberration control module is based on the following relationship:

$$z = \alpha \times [\exp\{\beta(x^2 x y^2)\} - 1] \times \cos\{n\theta\},$$

where z is an optical axis of the lens unit, x and y are orthogonal axes perpendicular to the optical axis, $|x| \leq 1$, and $|y| \leq 1$, $\alpha$, $\beta$, and n are coefficients;
a variable aperture stop operable to limit the light beam; and
an image pickup device operable to capture an object image in the light beam.

16. The electronic device according to claim 15, wherein the point-spread-function of the light beam is substantially circular if the aberration control module in the lens unit has a rotationally asymmetric shape with at least two periods in a circumferential direction.

17. The lens unit according to claim 9, wherein the point-spread-function of the light beam is substantially circular if the aberration control module has a rotationally asymmetric shape with at least two periods in a circumferential direction.

18. The lens unit according to claim 9, wherein the lens unit comprises an aperture stop and the aberration control module is adjacent to the aperture stop.

19. The lens unit according to claim 9, wherein the aberration control module comprises a function of an aperture stop.

20. The lens unit according to claim 17, wherein the rotationally asymmetric shape is defined by a continuous function of a combination of trigonometric waves.

21. The lens unit according to claim 20, wherein the rotationally asymmetric shape has different focal lengths in arbitrary cross sections including an optical axis.

22. The lens unit according to claim 17, wherein the rotationally asymmetric shape is a stepped periodical shape.

23. The lens unit according to claim 22, wherein the rotationally asymmetric shape comprises one of multiple focal lengths provided in an arbitrary cross section including an optical axis.

24. An image pickup apparatus, comprising:
a lens unit comprising:
a plurality of lenses;
an aberration control module operable to produce an aberration in a light beam passing through the lens unit to obtain a depth of field extension effect if a point-spread-function of the light beam passed through the lens unit becomes substantially circular, wherein the aberration control module is based on the following relationship:

$$z = \alpha \times [\exp\{\beta(x^2 x y^2)\} - 1] \times \sin\{n\theta\},$$

where z is an optical axis of the lens unit, x and y are orthogonal axes perpendicular to the optical axis, $|x| \leq 1$, and $|y| \leq 1$, $\alpha$, $\beta$, and n are coefficients; and
an image pickup device operable to capture an object image in the light beam.

25. The image pickup apparatus according to claim 24, wherein the point-spread-function of the light beam is substantially circular if the aberration control module in the lens unit has a rotationally asymmetric shape with at least two periods in a circumferential direction.

26. The image pickup apparatus according to claim 25, wherein the rotationally asymmetric shape is defined by a continuous function of a combination of trigonometric waves.

27. The image pickup apparatus according to claim 25, wherein the rotationally asymmetric shape has different focal lengths in a plurality of arbitrary cross sections including an optical axis.

28. The image pickup apparatus system according to claim 25, wherein the rotationally asymmetric shape is a stepped periodical shape.

29. An electronic device comprising an image pickup apparatus, wherein the image pickup apparatus comprises:

a lens unit comprising:

a plurality of lenses;

an aberration control module operable to produce an aberration in a light beam passing through the lens unit to obtain a depth of field extension effect if a point-spread-function of the light beam passed through the lens unit becomes substantially circular, wherein the aberration control module is based on the following relationship:

$$z = \alpha \times [\exp\{\beta(x^2 \times y^2)\} - 1] \times \sin\{n\theta\},$$

where z is an optical axis of the lens unit, x and y are orthogonal axes perpendicular to the optical axis, $|x| \leq 1$, and $|y| \leq 1$, $\alpha$, $\beta$, and n are coefficients;

a variable aperture stop operable to limit the light beam; and an image pickup device operable to capture an object image in the light beam.

30. The electronic device according to claim 29, wherein the point-spread-function of the light beam is substantially circular if the aberration control module in the lens unit has a rotationally asymmetric shape with at least two periods in a circumferential direction.

* * * * *